US012602609B2

(12) United States Patent
Nimavat et al.

(10) Patent No.: US 12,602,609 B2
(45) Date of Patent: Apr. 14, 2026

(54) UPDATING MACHINE LEARNING TRAINING DATA USING GRAPHICAL INPUTS

(71) Applicant: Oracle International Corporation, Redwood Shores, CA (US)

(72) Inventors: Ketakee Kishorkumar Nimavat, Foster City, CA (US); Rajiv Kumar, Austin, TX (US)

(73) Assignee: Oracle International Corporation, Redwood Shores, CA (US)

( * ) Notice: Subject to any disclaimer, the term of this patent is extended or adjusted under 35 U.S.C. 154(b) by 1123 days.

(21) Appl. No.: 17/178,360

(22) Filed: Feb. 18, 2021

(65) Prior Publication Data
US 2022/0261687 A1     Aug. 18, 2022

(51) Int. Cl.
*G06N 20/00*          (2019.01)
*G06N 5/04*           (2023.01)

(52) U.S. Cl.
CPC .............. *G06N 20/00* (2019.01); *G06N 5/04* (2013.01)

(58) Field of Classification Search
CPC ................................. G06N 20/00; G06N 5/04
USPC ........................................................ 706/14
See application file for complete search history.

(56) References Cited

U.S. PATENT DOCUMENTS

| | | | |
|---|---|---|---|
| 11,568,290 B2 * | 1/2023 | Watanabe | G06N 20/20 |
| 2008/0222062 A1 * | 9/2008 | Liu | G06N 7/01 |
| | | | 706/15 |
| 2012/0131591 A1 * | 5/2012 | Moorthi | G06F 9/5061 |
| | | | 718/104 |
| 2015/0242761 A1 * | 8/2015 | Amershi | G06F 3/048 |
| | | | 706/11 |
| 2016/0210535 A1 * | 7/2016 | Takimoto | G06F 18/217 |
| 2022/0004670 A1 * | 1/2022 | King | G06F 30/27 |

* cited by examiner

*Primary Examiner* — Abdullah Al Kawsar
*Assistant Examiner* — Jun Kwon
(74) *Attorney, Agent, or Firm* — Invoke

(57) ABSTRACT

Techniques are disclosed for using a machine learning model to identify and present a ranked array of interface elements representing entities. The location of individual interface elements within the ranked array of interface elements is based on a level of match between entity attributes and a set of requirements established by a user. The machine learning model may be further trained by receiving a user input that changes a location of a particular user interface element within a graphical user interface displaying the ranked array. Upon receiving the user input, the trained machine learning model may update training data to include an updated match score for the particular user interface element that reflects the new location.

19 Claims, 6 Drawing Sheets

| Requirements | Weight |
|---|---|
| Years Work Experience | 0.2 |
| Highest Degree Completed | 0.6 |
| Years Adv. Education | 0.4 |
| Highest Responsibility Level | 0.6 |

602

| 508 Attribute Values | |
|---|---|
| Years Work Experience | 5 |
| Highest Degree Completed | Ph.D |
| Years Adv. Education | 9 |
| Highest Responsibility Level | Individual Contributor |

604

| 552 Attribute Values | |
|---|---|
| Years Work Experience | 25 |
| Highest Degree Completed | B.S. |
| Years Adv. Education | 4 |
| Highest Responsibility Level | Division Manager |

| Requirements | Weight |
|---|---|
| Years Work Experience | 0.6 |
| Highest Degree Completed | 0.2 |
| Years Adv. Education | 0.4 |
| Highest Responsibility Level | 0.7 |

610

UPDATING MACHINE LEARNING TRAINING DATA USING GRAPHICAL INPUTS

TECHNICAL FIELD

The present disclosure relates to machine learning techniques. In particular, the present disclosure relates to updating machine learning training data using graphical inputs.

BACKGROUND

Machine learning involves techniques through which computing systems make inferences and adjustments during runtime rather than relying on static instruction sets to perform tasks. Machine learning has a wide range of applications, such as tuning search engine results, diagnosing medical conditions, recognizing images, recommending relevant items, forecasting resource utilization, responding to natural language inputs through virtual assistants, and improving autonomous driving vehicles, among several others.

In many applications, a training data set of content items is processed to train a machine learning (ML) model prior to using the trained ML model to analyze a new content item. For example, a training data set of documents may include entity profiles that include attributes, attribute values, and an indication of whether the attribute values in a particular profile are aligned with a set of requirements. An ML model may then be applied to new material to determine whether (or to what extent) a new entity profile matches the set of requirements.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 3, 4, 5, 6A, and 6B illustrate various features of an example embodiment in which training data for a trained machine learning model is updated via graphical inputs.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. UPDATING MACHINE LEARNING TRAINING DATA USING GRAPHICAL INPUTS
4. EXAMPLE EMBODIMENT
5. COMPUTER NETWORKS AND CLOUD NETWORKS
6. MISCELLANEOUS; EXTENSIONS
7. HARDWARE OVERVIEW

1. General Overview

One or more embodiments include a machine learning model configured to identify and present a ranked array of interface elements (e.g., icons) representing entities. The location of individual interface elements within the ranked array of interface elements is based on a level of match (a "match score") between entity attributes and a set of requirements established by a user. The machine learning model may be further trained by receiving a user input that changes a location of a particular user interface element within a graphical user interface displaying the ranked array. Upon receiving the user input, the trained machine learning model may update training data to include an updated match score for the particular user interface element that reflects the new location. This updated training may include generating a new match score for the particular user interface element and retraining the machine learning model based on training data that includes the new match score for the particular user interface element.

One or more embodiments described in this Specification and/or recited in the claims may not be included in this General Overview section.

2. Architectural Overview

Figure 1:
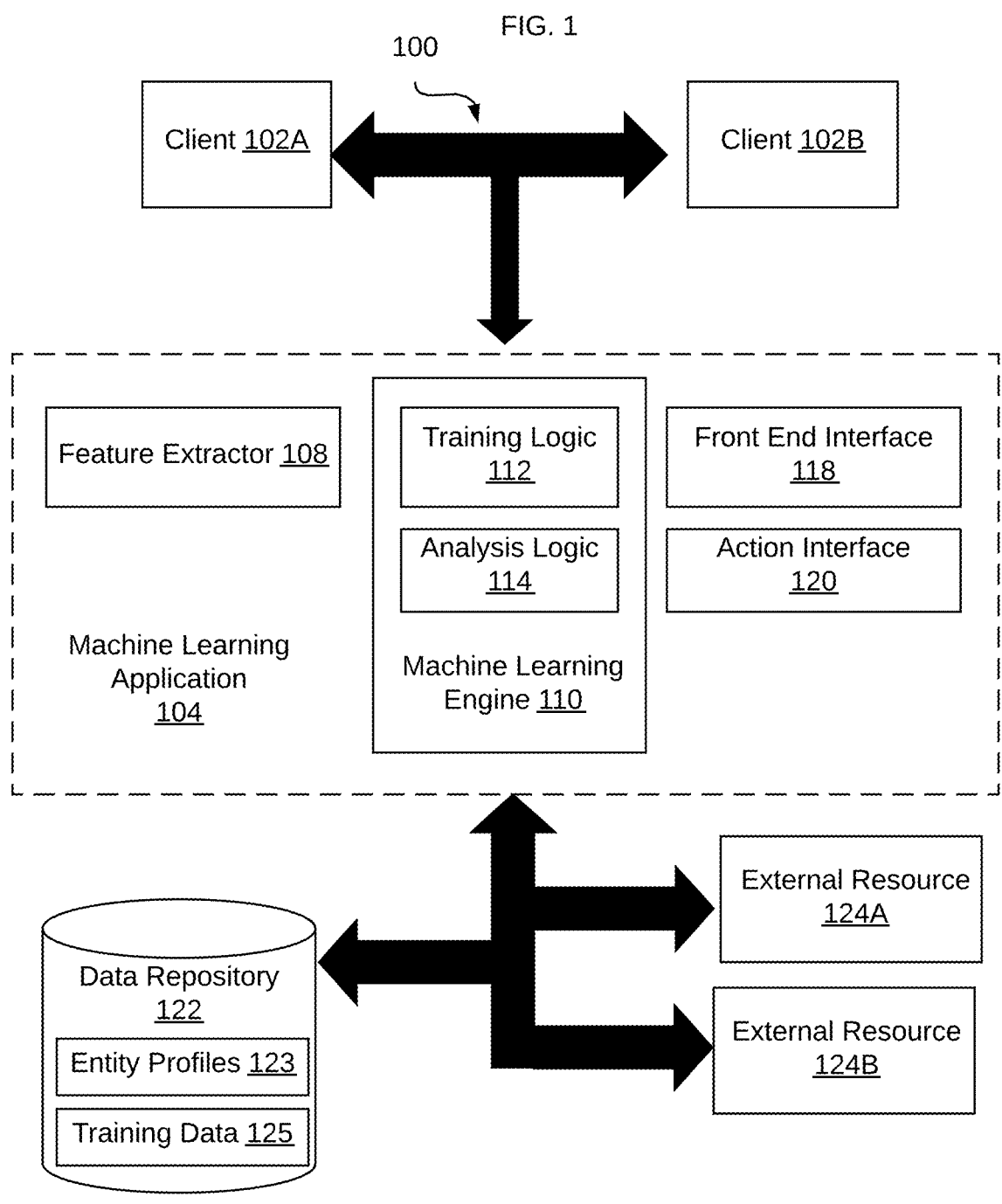
FIG. 1 illustrates a system in accordance with one or more embodiments.

FIG. 1 illustrates a system 100 in accordance with one or more embodiments. As illustrated in FIG. 1, system 100 includes a machine learning system for presenting a graphical user interface (GUI) of user interface elements in a ranked order. The system 100 may also include elements for updating a training data set based on user input that reorders the user interface elements within the ranked order. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

As illustrated in FIG. 1, system 100 includes clients 102A, 102B, a machine learning application 104, a data repository 122, and external resources 124A, 124B.

The clients 102A, 102B may be a web browser, a mobile application, or other software application communicatively coupled to a network (e.g., via a computing device). The clients 102A, 102B may interact with other elements of the system 100 directly or via cloud services using one or more communication protocols, such as HTTP and/or other communication protocols of the Internet Protocol (IP) suite.

In some examples, one or more of the clients 102A, 102B are configured to submit a set of requirements to the ML application 104. The ML application 104 may use the submitted requirements to generate match scores between attributes of various entities and generate a ranked array of user interface elements corresponding to the ranked entities, as described herein.

The clients 102A, 102B may also include a user device configured to render a graphic user interface (GUI) generated by the ML application 104. The GUI may present a ranked array of one or more entity user interface elements. Furthermore, the clients 102A, 102B may be configured to enable a user to reposition one or more entity user interface elements within a ranked array, thereby providing new data that the ML application 104 may use for training.

The machine learning (ML) application 104 is configured to receive training data, calculate match scores for entities based on entity attributes, and generate a graphic user interface that presents a ranked array of entity user interface elements based on the match scores. Furthermore, the ML application 104 is also configured to receive user input that re-orders the ranked array of user interface elements. The ML application 104 may use the re-ordered ranked array as additional training data that is used to re-train an ML engine within the ML application 104. In some embodiments, ML application 104 may be locally accessible to a user, such as a desktop or other standalone application or via clients 102A, 102B as described above.

In one or more embodiments, the machine learning application 104 refers to hardware and/or software configured to perform operations described herein for ranking entities and receiving user input via a GUI that, in turn, is used to re-train the machine learning application 104. Examples of operations for these processes are described below with reference to FIG. 2.

The machine learning application 104 includes a feature extractor 108, a machine learning engine 110, a frontend interface 118, and an action interface 120

The feature extractor 108 may be configured to identify attributes and corresponding values in data sets and generate corresponding feature vectors. For example, the feature extractor 108 may identify entity attributes within training data and/or "target" data that a trained ML model is directed to analyze. Once identified, the feature extractor 108 may extract attribute values from one or both of training data and target data.

The feature extractor 108 may tokenize attributes (e.g., entity attributes) into tokens. The feature extractor 108 may then generate feature vectors that include a sequence of values, with each value representing a different attribute token. The feature extractor 108 may use a document-to-vector (colloquially described as "doc-to-vec") model to tokenize attributes and generate feature vectors corresponding to one or both of training data and target data.

The feature extractor 108 may append other features to the generated feature vectors. In one example, a feature vector may be represented as $[f_1, f_2, f_3, f_4]$, where $f_1, f_2, f_3$ correspond to attribute tokens and where $f_4$ is a non-attribute feature. Example non-attribute features may include, but are not limited to, a label quantifying a weight (or weights) to assign to one or more attributes of a set of attributes described by a feature vector. In some examples, a label may quantify an extent of a match between a set of requirements and a feature vector associated with a particular entity (whether found in target data or training data). In some examples, the label may correspond to a binary value that indicates whether or not a set of one or more attributes matches a set of one or more requirements. The feature extractor 108 may optionally be applied to target data to generate feature vectors from target data, which may facilitate analysis of the target data.

The machine learning engine 110 further includes training logic 112, analysis logic and 114.

In some examples, the training logic 112 receives a set of electronic files as input (i.e., a training corpus or training data set). Examples of electronic documents include, but are not limited to, electronic entity files that include entity attributes and corresponding entity attribute values. In some examples, training data used by the training logic 112 to train the machine learning engine 110 includes feature vectors of entity files that are generated by the feature extractor 108, described above.

A training data set may also include a set of requirements, such as desired attribute value ranges, maximum attribute values, minimum attribute values, and/or attribute weights. These requirements may also be represented as feature vectors. A training data set may also include one or more labels that identify a degree of match between the attribute values associated with a particular entity and a corresponding set of requirements. This degree of match is otherwise referred to as a "match score" herein. As described below, a match score label may be applied and/or changed for an entity in response to a user altering a location a graphical user interface element corresponding to an entity within a graphical user interface. The applied and/or changed match score label may then be used by the system as training data. In some examples, the match score may be a binary value of "matching" or "not matching."

The training logic 112 may be in communication with a user system, such as clients 102A, 102B. The clients 102A, 102B may include an interface used by a user to apply labels to the electronically stored training data set.

The machine learning (ML) engine 110 is configured to automatically learn, via the training logic 112, a relative importance of various attributes and generate a match score corresponding to the overall matching between the various attributes and a set of requirements. The relative importance of various attributes may be represented as corresponding attribute weights so that a weighted average (or sum or other mathematical output) of the various attributes may be used to generate a match score. The ML engine 110 may also identify these attributes and their relative proportions within target data.

The ML engine 110 may generate a graphical user interface presenting a ranked array of individual user interface elements corresponding to the analyzed and ranked target data. Furthermore, the ML engine 110 may also update training data upon receiving user input that manually re-orders user interface elements within the graphical user interface. More specifically, as described below in more detail, the ML engine 110 may receive changes to a location of one or more user interface elements within the ranked array of user interface elements. Based on the received changes to location, the ML engine 110 (via the analysis logic 114) may identify and adjust attributes weights in training data.

The analysis logic 114 applies the trained machine learning engine 110 to analyze target data, such as entity profiles stored in an entity profile store 123 of the data repository 122. Target entity profile data may include one or more attributes and corresponding attribute values. The entity attributes and attribute values may be analyzed by the analysis logic 114 for similarities to the training data describe above. The analysis executed by the analysis logic 114 may include generating a match score between an entity (and its collective attributes) and a set of requirements.

In one example, the analysis logic 114 may identify equivalent and/or comparable attributes between one or more entities and the training data and/or the set of requirements. In some examples, the analysis logic 114 may include facilities for natural language processing so that comparable attributes in entity profiles and training data may be identified regardless of differences in wording. Examples of natural language processing algorithms that the analysis logic 114 may employ include, but are not limited to, document term frequency (TF), term frequency-inverse document frequency (TF-IDF) vectors, transformed versions thereof (e.g., singular value decomposition), among others. In another example, feature vectors may also include topic model based feature vectors for latent topic modeling. Examples of topic modeling algorithms include, but are not limited to, latent Dirichlet allocation (LDA) or correlated topic modeling (CTM). It will be appreciated that other types of vectors may be used in probabilistic analyses of latent topics.

Once the analysis logic 114 identifies attributes in target data and corresponding attributes and attribute weights in training data, the analysis logic 114 determines a similarity between the target data attributes and the training data. For example, the analysis logic 114 may execute a similarity analysis (e.g., cosine similarity) that generates a match score quantifying a degree of similarity between target data and training data. One or more of the attributes that form the basis of the comparison between the training data and the target data may be weighted according to the relative importance of the attribute as determined by the training logic 112. The comparison and the relative weights may be used to generate a match score for a particular entity that is based on a similarity with training data, entity attribute values, and weights corresponding to entity attributes.

The frontend interface 118 manages interactions between the clients 102A, 102B and the ML application 104. In one or more embodiments, frontend interface 118 refers to hardware and/or software configured to facilitate communications between a user and the clients 102A,102B and/or the machine learning application 104. In some embodiments, frontend interface 118 is a presentation tier in a multitier application. Frontend interface 118 may process requests received from clients and translate results from other application tiers into a format that may be understood or processed by the clients.

For example, one or both of the client 102A, 102B may submit requests to the ML application 104 via the frontend interface 118 to perform various functions, such as label training data or analyze target data. In some examples, one or both of the clients 102A, 102B may submit requests to the ML application 104 via the frontend interface 118 to view a graphic user interface of a ranked array of interface elements corresponding to entities. In still further examples, the frontend interface 118 may receive user input that re-orders individual interface elements.

Frontend interface 118 refers to hardware and/or software that may be configured to render user interface elements and receive input via user interface elements. For example, frontend interface 118 may generate webpages and/or other graphical user interface (GUI) objects. Client applications, such as web browsers, may access and render interactive displays in accordance with protocols of the internet protocol (IP) suite. Additionally or alternatively, frontend interface 118 may provide other types of user interfaces comprising hardware and/or software configured to facilitate communications between a user and the application. Example interfaces include, but are not limited to, GUIs, web interfaces, command line interfaces (CLIs), haptic interfaces, and voice command interfaces. Example user interface elements include, but are not limited to, checkboxes, radio buttons, dropdown lists, list boxes, buttons, toggles, text fields, date and time selectors, command lines, sliders, pages, and forms.

In an embodiment, different components of the frontend interface 118 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, the frontend interface 118 is specified in one or more other languages, such as Java, C, or C++.

The action interface 120 may include an API, CLI, or other interfaces for invoking functions to execute actions. One or more of these functions may be provided through cloud services or other applications, which may be external to the machine learning application 104. For example, one or more components of machine learning application 104 may invoke an API to access information stored in data repository 122 for use as a training corpus for the machine learning engine 104. It will be appreciated that the actions that are performed may vary from implementation to implementation.

In some embodiments, the machine learning application 104 may access external resources, such as cloud services. Example cloud services may include, but are not limited to, social media platforms, email services, short messaging services, enterprise management systems, and other cloud applications. Action interface 120 may serve as an API endpoint for invoking a cloud service. For example, action interface 120 may generate outbound requests that conform to protocols ingestible by external resources.

Additional embodiments and/or examples relating to computer networks are described below in Section 5, titled "Computer Networks and Cloud Networks."

Action interface 120 may process and translate inbound requests to allow for further processing by other components of the machine learning application 104. The action interface 120 may store, negotiate, and/or otherwise manage authentication information for accessing external resources. Example authentication information may include, but is not limited to, digital certificates, cryptographic keys, usernames, and passwords. Action interface 120 may include authentication information in the requests to invoke functions provided through external resources.

In one or more embodiments, a data repository 122 is any type of storage unit and/or device (e.g., a file system, database, collection of tables, or any other storage mechanism) for storing data. Further, a data repository 122 may include multiple different storage units and/or devices. The multiple different storage units and/or devices may or may not be of the same type or located at the same physical site. Further, a data repository 122 may be implemented or may execute on the same computing system as the ML application 104. Alternatively or additionally, a data repository 122 may be implemented or executed on a computing system separate from the ML application 104. A data repository 122 may be communicatively coupled to the ML application 104 via a direct connection or via a network.

Information describing entities, entity attributes, and the training data may be implemented across any of components within the system 100. However, this information is illustrated within the data repository 122 for purposes of clarity and explanation. As illustrated in FIG. 1, entity profiles that store attributes and corresponding attributes values for one or more corresponding entities are stored in entity profile store 123. Training data, as described above, is stored in training data store 125.

In one or more embodiments, the ML application 104 and/or system 100 refers to hardware and/or software configured to perform operations described herein for generating a ranked array of user interface elements corresponding to entities using machine learning. The ML application 104 and/or system 100 also refers to processes for updating a ranking analysis (e.g., attribute weights) based on user-received re-ordering of graphical interface elements corresponding to the entities. Examples of operations for these processes are described below with reference to FIG. 2.

In an embodiment, the system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Updating Machine Learning Training Data Using Graphical Inputs

Figure 2:
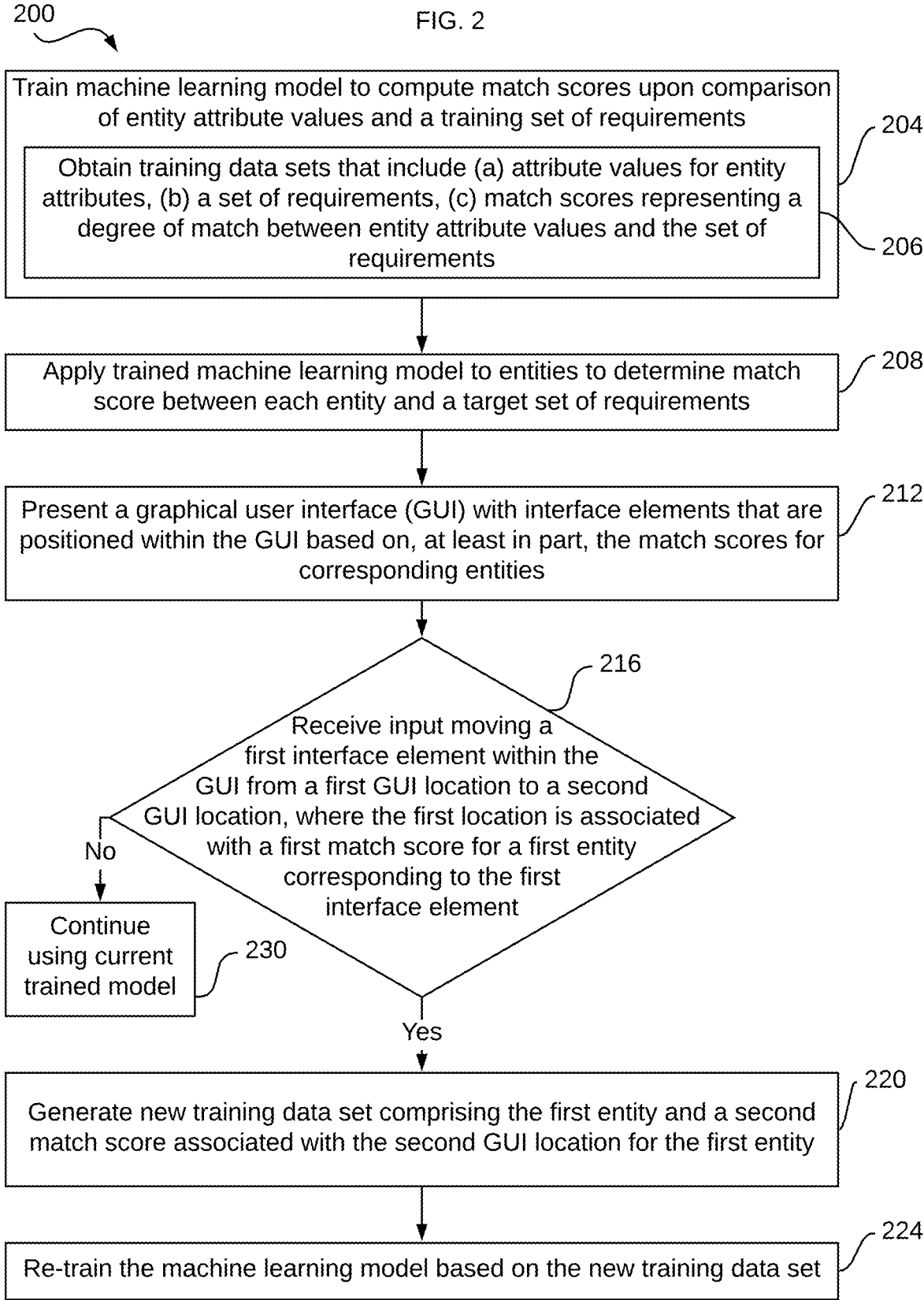
FIG. 2 illustrates an example set of operations for updating a training data set for a trained machine learning model using modifications to an order of graphical interface elements in a ranked array in accordance with one or more embodiments.

FIG. 2 illustrates an example set of operations, referred to collectively as a method 200, for generating and rendering a ranked array of user interface elements, where individual user interface elements correspond to individual entities in accordance with one or more embodiments. Elements of the method 200 depicted in FIG. 2 are associated with updating a training data set with user input that re-orders one or more of the user interface elements corresponding to entities within the ranked list. One or more operations illustrated in FIG. 2 may be modified, rearranged, or omitted all together. Accordingly, the particular sequence of operations illustrated in FIG. 2 should not be construed as limiting the scope of one or more embodiments.

The method 200 begins by training a machine learning model to generate (or equivalently, compute) match scores by comparing entity attribute values to a set of requirements (operation 204). The system may train a machine learning model in one example by obtaining training data sets that include attributes and corresponding attribute values for one or more entities (operation 206). The training data sets may also include a set of requirements against which entity attribute values are compared (operation 206). The training data sets may also include a match score representing a degree of match between entity attribute values and the set of requirements (operation 206). The collective training data set of attributes, attribute values, and match scores may be used to train the machine learning model.

The term "entities" as used herein is a generic term meant to encompass any of a number of types of discrete subjects that may be compared to a set of requirements to rank the entities against the set of requirements. One example of an entity includes any type of applicant that is evaluated against a set of requirements. In one embodiment, an applicant-type of entity is an application for an employment or scholastic (e.g., a student) position at an employer or school, respectively. In both of these cases, an applicant is evaluated for suitability of the position (or academic institution seat) against a set of desired criteria ("requirements"). Another embodiment of an entity is that of a corporate organization submitting a response to a request for proposal (RFP). In this example, the one or more entities submitting responses to an RFP are evaluated as to their technical and financial competitiveness relative to a set of desired criteria. These examples of entities are presented for convenience of explanation. The techniques described herein may be applied to other types of entities.

A set of requirements used for training data (and for target data, described below) may be adapted according to the entities being ranked. At a generic level, a set of requirements may include financial requirements, performance requirements, types of experiences, experience levels, certifications (e.g., from accredited institutions or industry certification organizations), or other requirements. Specific embodiments of requirements may include attributes associated with an employment history (years of service, levels of responsibility, disciplinary record), academic credentials (years of schooling completed, degrees or certificates granted), capabilities (e.g., business functions such as billing, types of services or products provided), location, minimum and/or maximum bid price or estimated cost, and the like.

In some examples, the set of requirements may include a concise or well defined attribute and a corresponding attribute value (e.g., structured data). For example, an attribute for "minimum bid/maximum bid" may be associated with attribute values of "$100/$1000." In addition to a concise and/or standardized attribute name, the system may also apply natural language techniques to identify attributes and associated attribute values for an entity even if the entity provides data in a narrative form (e.g., unstructured data). For example, a narrative description in a response to a request for proposal may state "our best price is $775 and we will not exceed that amount by any more than 10%." The machine learning system, using natural language processing, topic extraction, and other machine learning training techniques, may correctly interpret this as attribute values of "$775/$850."

The training data may include a "match score" that quantifies a degree of similarity between attribute values for an entity and a set of requirements. In some examples, the match score may be calculated using any of a variety of similarity scores that include, but are not limited to, cosine similarity techniques.

In some examples, the system generates a match score corresponding to an entity as a whole relative to the set of requirements. In some examples, the system may first generate match scores individually for particular attributes associated with an entity and corresponding requirements of the set of requirements. The system may then generate a match score for an entity as a whole using these individual match scores. In some examples, the match score for the entity as a whole may be generated by generating an average, a weighted average, or a sum of the match scores for the particular individual attributes.

Once the system has generated a match score, the system may apply a label to the training data set thereby quantifying the degree of match between entity attributes/attribute values and a corresponding set of requirements. The system may then train a machine learning model with the collective data of entity attributes and attribute values, the set of requirements, and the match score described above.

Once trained, the system may apply the trained machine learning model to target entity data to determine a match between a target entity and a target set of requirements (operation 208). The operation 208 is performed using techniques analogous to those described above for training a machine learning model. For example, the trained machine learning model may receive entity data and identify attributes and/or attribute values within the entity data. In examples in which the entity data is provided in an unstructured format, the system may apply natural language processing techniques to identify attributes and/or corresponding attribute values within the entity data. The system may analyze structured data (e.g., such as data submitted via a form) by abstracting values from corresponding attribute locations within the structure.

The system may then generate a match score for a particular entity in light of a target set of requirements (operation 208). The system may generate a match score (e.g., using a cosine similarity technique) for an entity as a whole relative to a set of requirements. In one example, this may be done by collectively analyzing a similarity between the collective attribute values and the collective corresponding set of requirements. In another example, the system may generate the match score by generating individual match scores between individual requirements in the set of requirements and corresponding entity attributes. Then, these individual match scores may be averaged, averaged with differing weights, and/or summed to generate an entity-level match score relative to the entire set of requirements. These calculations may, in some cases, not be used when the match score is a binary value. The system may repeat this process for some or all of the entities evaluated relative to the set of requirements.

The system may then generate a graphical user interface (GUI) that presents individual interface elements, each of which corresponds to an entity, positioned within the GUI based on, at least in part, an entity match score (operation 212). The GUI may have any of a number of configurations that are generically referred to as a "ranked array." In one example of a ranked array, the individual interface elements that correspond to entities may be arranged in a list format in which a first interface element associated with a highest match score is at a top of the GUI list and a second interface element associated with a lowest match score is at a bottom of the GUI list (opposite the top). In another example of a ranked array, the individual interface elements may be arranged in a grid. In one embodiment, decade tiers of match scores (e.g., 90-100, 80-89, 70-79) are arranged in rows of the grid and individual units within the decade (e.g., 90-92, 93-94) are arranged in columns.

As described below in more detail, individual user interface elements may themselves include indications of a degree of a match. For example, one or more user interface elements may be colored (e.g., black, red) to indicate a binary match score of "no match." In other examples, the system may generate shaded interface elements to indicate a degree of match. One extreme of shading (e.g., black) may indicate a binary match score of "no match" with the set of requirements and another extreme (e.g., white) may indicate a binary match score of "match" with the set of requirements. Shades of gray may indicate intervening levels of matching. This shading may be performed using colors as well (e.g., from red to green) and not merely grayscale shading.

In some example, one or more user interface elements may include one or both of a grayscale shading value (from white to black) and/or a color scheme to indicate an evaluation status of an entity. As presented above, one type of application for the techniques described herein is to rank different entities relative to a set of criteria so that, ultimately, a subset of the entities may be selected. Selection processes often include multiple stages of further inquiring and/or negotiation before a disposition (mutual agreement, acceptance, denial) is reached. In some examples, a grayscale shading value and/or a color scheme may be used to indicate a stage of a selection process. For example, a white background in an interface element may indicate that an entity remains a candidate and no additional inquiry has been performed. A gray background in an interface element may indicate that an entity has been contacted and discussions are pending. A green background in an interface element may indicate that an entity has been accepted or approved. A black background in an interface element may indicate that an entity has been rejected.

After presenting a GUI as described above in the operation 212, the system may receive user input that re-orders one or more user interface elements corresponding to one or more entities within the GUI (operation 216). More specifically, the system may receive input that moves one interface element from a first location within the GUI (e.g., the ranked list or grid) to a second, different location within the GUI. Locations within the GUI are associated with match scores. For example, a second match score for the first user interface element moved to the second location may be generated based on a match score associated with one or more neighboring user interface elements. If the second location for the first user interface element is between two other user interface elements, the second match score for the first user interface element may be an average value of the match scores of the neighboring user interface elements. In another example, the second match score for the first user interface element may be based on a cosine similarity score with one or more neighboring user interface elements. In still other embodiments, the system may re-calculate attribute weights based on the re-located interface element and apply the re-calculated weights to a revised match score.

The system may then generate new training data that reflects the second (i.e., revised) match score for the first entity that is based on the second location for the corresponding user interface element (operation 220). In some examples, the system may update a corresponding label in the training data with the second match score that corresponds to the second location of the first user interface element.

In some examples, the system is configured to accommodate individual preferences. For example, different users of the system may have corresponding different user profiles that store corresponding revisions to the training data. While the system may be trained with a common training data set, different user inputs provided by different users may be stored in corresponding user profiles. These may be used to re-train or otherwise modify the calculations by which different attributes are weighted to form a ranked array of entities.

Regardless, the updates to the training data may be used to re-train a machine learning model so that rankings associated with the new training data are reflected in future computations (operation 224). The same training techniques described above in the context of. operations 204 and 206 may be applied to operation 224.

Alternatively, if no input is received, the system may use the current training (operation 230). In some examples, the system may interpret not receiving input as data and increase weight of a training data set relative to any new training data sets received. This technique (or other similar techniques) may be used to reflect the accuracy of an existing training data set (used for a number of analyses without change) in light of subsequently received new training data sets.

4. Example Embodiment

Detailed examples are described below for purposes of clarity. Components and/or operations described below should be understood as one specific example which may not be applicable to certain embodiments. Accordingly, components and/or operations described below should not be construed as limiting the scope of any of the claims.

Figure 3:
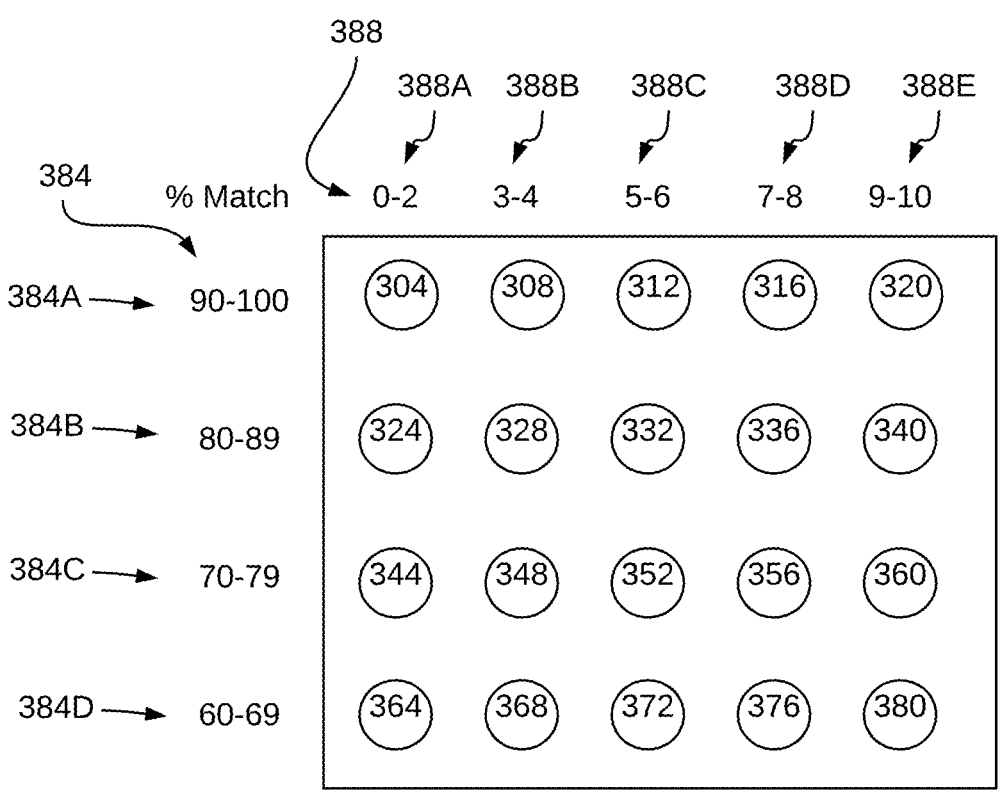

FIG. 3 illustrates an example graphical user interface (GUI) 300 that includes a number of user interface elements 304-380. Each of the user interface elements 304-380 correspond to an entity and are arranged in the GUI 300 in a ranked array that reflects a match score between attribute values of the entity and a set of requirements.

In this example, the ranked array of user interface elements 304-380 is arranged in a grid format. In this example format, a user may identify a percentage match of a particular entity and/or patterns of matches within a group of ranked entities with a glance. Rows 384A-384D (collectively 384) identify decade "tiers" of a percentage match. Columns 388A-388D (collectively 388) identify a finer graduation of match within the tiers. As described above, the match scores are generated based on entity attributes in light of a set of requirements.

As illustrated, row 384A identifies user interface elements 304, 308, 312, 316, and 320 as having a match score from 90% to 100%. Row 388A indicates that user interface element 304 has a match score from 90% to 92%. Row 388B indicates that user interface element 308 has a match score from 93% to 94%. Row 388C indicates that user interface element 312 has a match score from 95% to 96%. Row 388D indicates that user interface element 316 has a match score from 97% to 98%. Row 388E indicates that user interface element 316 has a match score from 99% to 100%.

Figures 4, 5:
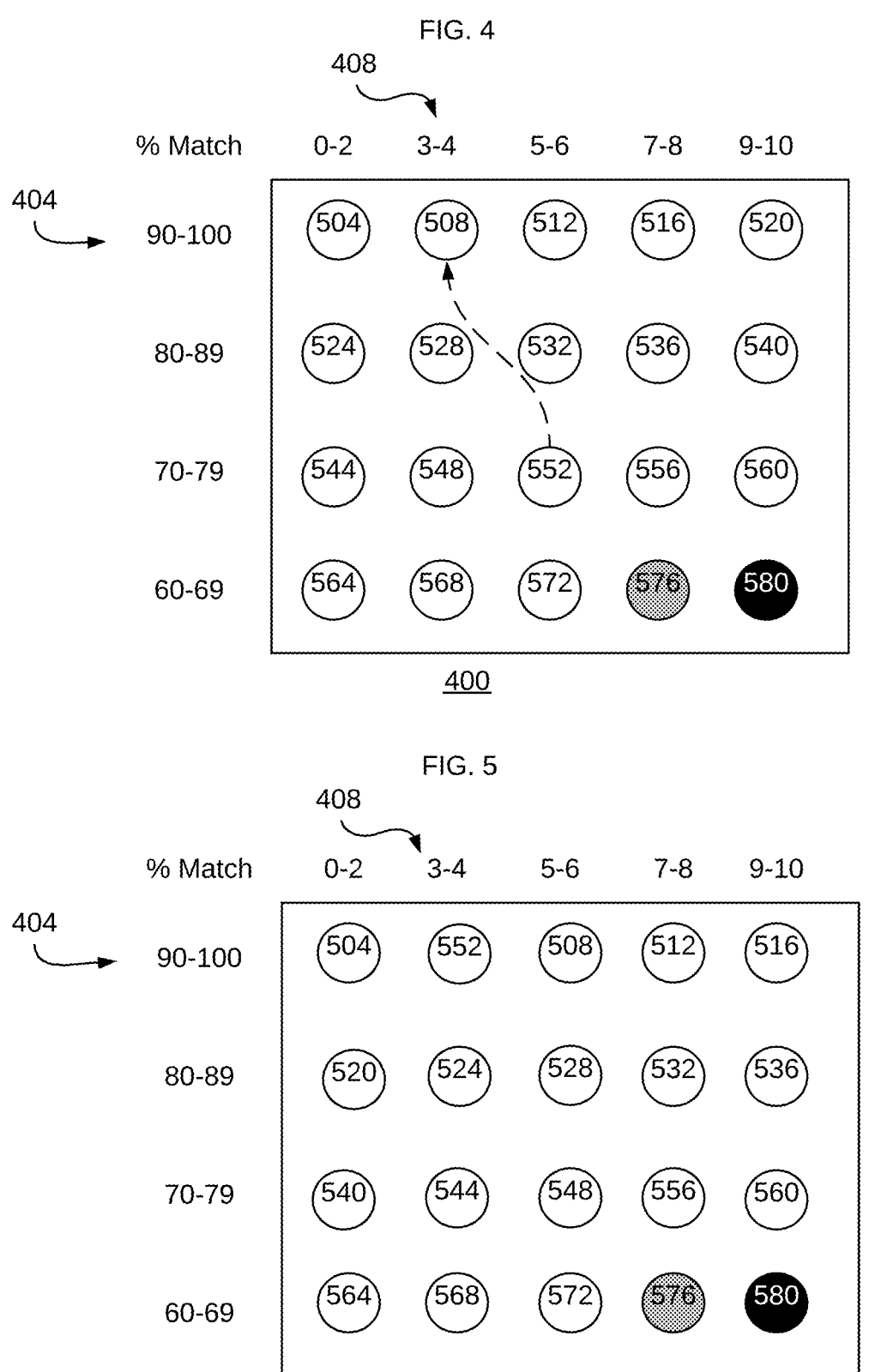

FIGS. 4 and 5 together illustrate the process by which the system may receive user input that re-orders one or more of the user interface elements, thereby providing new data to the trained machine learning model. This new data may be instantiated as a new training data set that is used to re-train the model so that it emphasizes (e.g., recalculates weights) attributes differently in light of the set of requirements.

Turning first to FIG. 4, the GUI 400 includes user interface elements 504-580. The GUI 400 and the user interface elements 504-580 are analogous to those described above in the context of FIG. 3 and the GUI 300.

As schematically illustrated by a dashed arrow in FIG. 4, interface element 552 is repositioned, in response to received user input, from its existing position within the GUI 400 to a new position within row 404 and column 408. FIG. 5 illustrates a GUI 500 in which the interface element 552 is in its new position. As described above, this new position generates a new ranking (a higher match score than interface element 508) for the entity corresponding to the interface element 552. The system then applies the new ranking to generate new training data or update existing training data, which may be used to re-train the machine learning model.

The user interface elements 576 and 580 are shaded to indicate an evaluation status of the corresponding entities. Namely that an evaluation of the entity corresponding to interface element 576 is underway (gray) and that the entity corresponding to interface element 580 has been rejected. The remaining interface elements 504-572 are shaded to indicate that no additional evaluation has been performed (e.g., no direct contact with the corresponding entities).

FIG. 6A provides a schematic illustration of the re-ranking analysis initiated by repositioning interface element 552 in the new position shown in FIG. 5. FIG. 6A includes a depiction 602 of a first set of requirements and corresponding weights, a depiction 604 of attributes and attribute values for the entity corresponding to the interface element 508, and a depiction 608 of attributes and attribute values for the entity corresponding to the interface element 552.

As shown in depiction 602, the highest attribute weights are applied to attributes of "highest degree completed" and a "highest responsibility level." These two attributes both have a weight of 0.6, which increases their contribution to the match score relative to other attributes with lower weights. A "number of years of work experience" has the least emphasis with a weight of 0.2. A "number of years of advanced education" is between the extremes, with a weight of 0.4. Based on the requirements illustrated in depiction 602, the system generates a match score based on attribute values in the depiction 604 in which the entity corresponding to interface element 508 has a higher match score than the entity corresponding to interface element 552. This first match score scenario is illustrated in FIG. 4.

The system interprets the relocation of the interface element 552 as data for re-training the ML model. In one example, the system implements this retraining as changing weights associated with various attributes, thereby changing the proportional contribution of different attribute values to an overall match score. These changes are illustrated in FIG. 6B as depiction 610.

Turning in detail to FIG. 6B, presented for purposes of illustration and convenience of explanation, the system increases weights associated with years of work experience (from 0.2 to 0.6) and a highest responsibility level (from 0.6 to 0.7) in response to the repositioning of the interface element 552 as shown in FIG. 5. Similarly, the system reduces weights of the highest degree completed (from 0.6 to 0.2). In some examples, an attribute value for a most heavily weighted attribute for an entity (e.g., highest degree completed in depiction 604) may be displayed in a GUI (e.g., as a pop-up window upon mousing over an icon in GUI 400 or GUI 500).

In some examples, the system may apply the re-trained model that uses these revised attribute weights to generate an updated ranked array of the attributes. Similarly, in some examples, a new ranked array of the various entities may be generated based on the new training.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used in this section refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
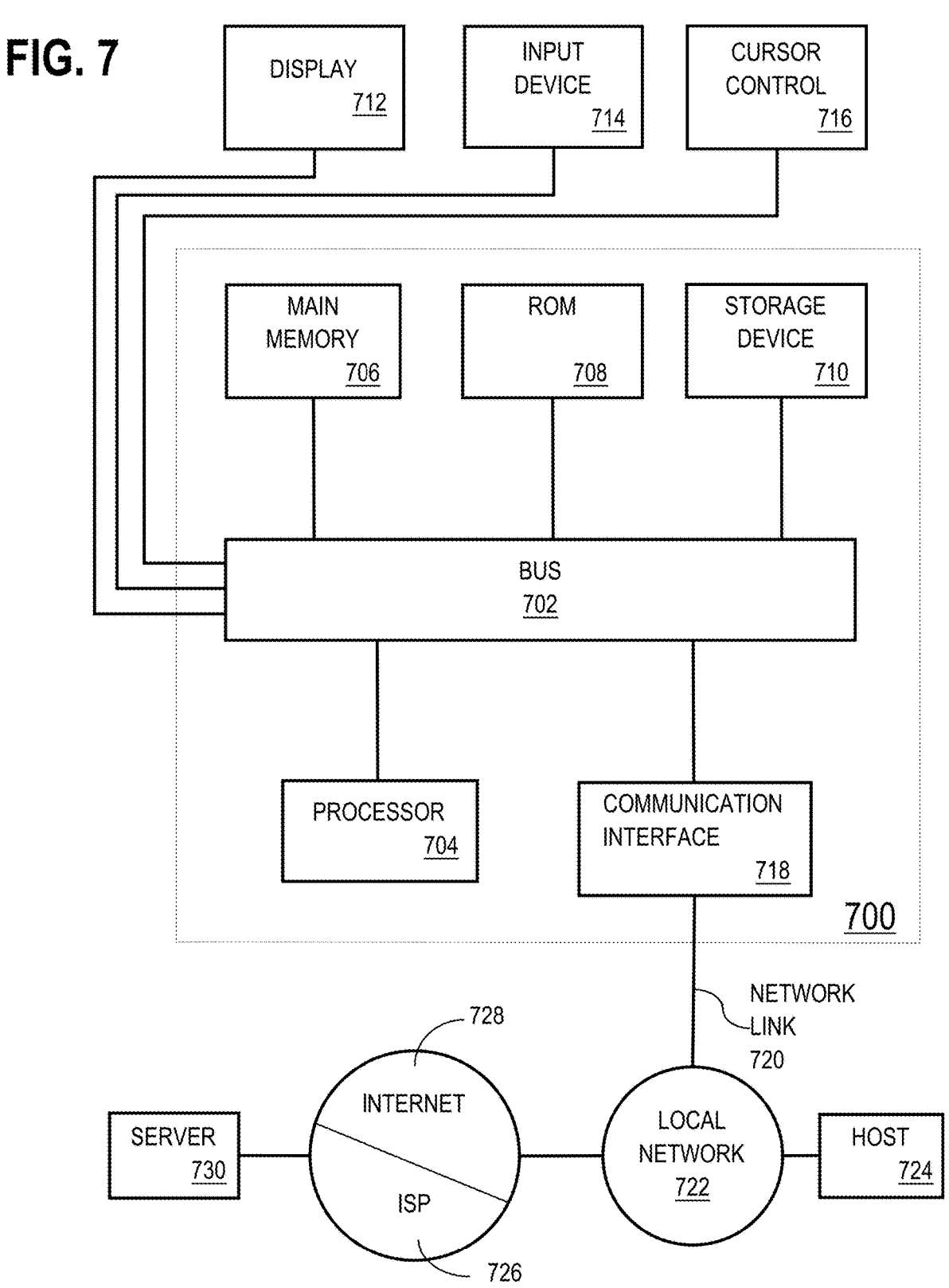
FIG. 7 shows a block diagram that illustrates a computer system in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions, which when executed by one or more hardware processors, cause performance of operations comprising:

training a machine learning model to compute match scores representing a match between entities and sets of requirements at least by:

obtaining training data sets, each training data set comprising:

attribute values for a set of entity attributes;

a set of requirements;

a match score representing the match between the attribute values for the set of entity attributes and the set of requirements;

training the machine learning model based on the training data sets;

applying the machine learning model to a plurality of entities to determine a match score for each of the plurality of entities in relation to a particular set of requirements;

generating a Graphical User Interface (GUI) that presents a plurality of interface elements respectively representing the plurality of entities, wherein a location of each particular interface element, of the plurality of interface elements, within the GUI is based at least in part on a match score of a corresponding particular entity of the plurality of entities that is represented by the corresponding particular interface element;

receiving user input moving a first interface element of the plurality of interface elements from a first location in the GUI to a second location in the GUI, wherein the first location in the GUI is associated with a first match score computed for a first entity corresponding to the first interface element;

responsive to receiving the user input moving the first interface element to the second location in the GUI:

determining a second match score for the first entity, based at least in part on (a) the second location of the first interface element in the GUI and (b) two or more match scores associated respectively with two or more interface elements, in the plurality of interface elements, that neighbor the second location in the GUI;

generating a new training data set comprising the first entity, the particular set of requirements, and the second match score; and re-training the machine learning model based at least on the new training data set.

2. The media of claim 1, wherein at least some of the interface elements of the plurality of interface elements comprise one or both of a color or a shading value indicating an evaluation status of a corresponding entity.

3. The media of claim 2, wherein the evaluation status of the corresponding entity comprises rejected, pending, or accepted.

4. The media of claim 1, wherein at least one interface element further comprises a display of a first requirement and a corresponding entity attribute value.

5. The media of claim 1, wherein generating the new training data set comprises changing weights of requirements corresponding to entity attributes having corresponding match scores above a threshold.

6. The media of claim 1, wherein at least some of the interface elements of the plurality of interface elements comprise one or both of a color or a shading value indicating one of the first match score or the second match score.

7. The media of claim 6, further comprising updating one or both of the color or the shading value indicating one of the first match score or the second match score based on the re-trained machine learning model.

8. A method comprising:

training a machine learning model to compute match scores representing a match between entities and sets of requirements at least by:

obtaining training data sets, each training data set comprising:

attribute values for a set of entity attributes;

a set of requirements;

a match score representing the match between the attribute values for the set of entity attributes and the set of requirements;

training the machine learning model based on the training data sets;

applying the machine learning model to a plurality of entities to determine a match score for each of the plurality of entities in relation to a particular set of requirements;

generating a Graphical User Interface (GUI) that presents a plurality of interface elements respectively representing the plurality of entities, wherein a location of each particular interface element, of the plurality of interface elements, within the GUI is based at least in part on a match score of a corresponding particular entity of the plurality of entities that is represented by the corresponding particular interface element;

receiving user input moving a first interface element of the plurality of interface elements from a first location in the GUI to a second location in the GUI, wherein the first location in the GUI is associated with a first match score computed for a first entity corresponding to the first interface element;

responsive to receiving the user input moving the first interface element to the second location in the GUI:

determining a second match score for the first entity, based at least in part on (a) the second location of the first interface element in the GUI and (b) two or more match scores associated respectively with two or more interface elements, in the plurality of interface elements, that neighbor the second location in the GUI;

generating a new training data set comprising the first entity, the particular set of requirements, and the second match score; and re-training the machine learning model based at least on the new training data set, wherein the method is performed by at least one device including a hardware processor.

9. The method of claim 8, wherein at least some of the interface elements of the plurality of interface elements comprise one or both of a color or a shading value indicating an evaluation status of a corresponding entity.

10. The method of claim 8, wherein at least one interface element further comprises a display of a first requirement and a corresponding entity attribute value.

11. The method of claim 8, wherein generating the new training data set comprises changing weights of requirements corresponding to entity attributes having corresponding match scores above a threshold.

12. The method of claim 8, wherein at least some of the interface elements of the plurality of interface elements comprise one or both of a color or a shading value indicating one of the first match score or the second match score.

13. The method of claim 12, further comprising updating one or both of the color or the shading value indicating one of the first match score or the second match score based on the re-trained machine learning model.

14. A system comprising:

at least one device including a hardware processor;

the system being configured to perform operations comprising:

training a machine learning model to compute match scores representing a match between entities and sets of requirements at least by:

obtaining training data sets, each training data set comprising:

attribute values for a set of entity attributes;

a set of requirements;

a match score representing the match between the attribute values for the set of entity attributes and the set of requirements;

training the machine learning model based on the training data sets;

applying the machine learning model to a plurality of entities to determine a match score for each of the plurality of entities in relation to a particular set of requirements;

generating a Graphical User Interface (GUI) that presents a plurality of interface elements respectively representing the plurality of entities, wherein a location of each particular interface element, of the plurality of interface elements, within the GUI is based at least in part on a match score of a corresponding particular entity of the plurality of entities that is represented by the corresponding particular interface element;

receiving user input moving a first interface element of the plurality of interface elements from a first location in the GUI to a second location in the GUI, wherein the first location in the GUI is associated with a first match score computed for a first entity corresponding to the first interface element;

responsive to receiving the user input moving the first interface element to the second location in the GUI:

determining a second match score for the first entity, based at least in part on (a) the second location of the first interface element in the GUI and (b) two or more match scores associated respectively with two or more interface elements, in the plurality of interface elements, that neighbor the second location in the GUI;

generating a new training data set comprising the first entity, the particular set of requirements, and the second match score; and re-training the machine learning model based at least on the new training data set.

15. The system of claim 14, wherein at least some of the interface elements of the plurality of interface elements comprise one or both of a color or a shading value indicating an evaluation status of a corresponding entity.

16. The system of claim 14, wherein at least one interface element further comprises a display of a first requirement and a corresponding entity attribute value.

17. The system of claim 14, wherein generating the new training data set comprises changing weights of requirements corresponding to entity attributes having corresponding match scores above a threshold.

18. The system of claim 14, wherein at least some of the interface elements of the plurality of interface elements comprise one or both of a color or a shading value indicating one of the first match score or the second match score.

19. The system of claim 18, further comprising updating one or both of the color or the shading value indicating one of the first match score or the second match score based on the re-trained machine learning model.

* * * * *